US009540856B2

(12) United States Patent
Lin

(10) Patent No.: US 9,540,856 B2
(45) Date of Patent: Jan. 10, 2017

(54) THIN PIVOTAL APPARATUS

(71) Applicant: Sinher Technology Inc., New Taipei (TW)

(72) Inventor: Wen-Yan Lin, New Taipei (TW)

(73) Assignee: SINHER TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/946,211

(22) Filed: Nov. 19, 2015

(65) Prior Publication Data
US 2016/0319581 A1 Nov. 3, 2016

(30) Foreign Application Priority Data
May 1, 2015 (TW) .............................. 104206687 U

(51) Int. Cl.
*E05F 1/08* (2006.01)
*E05F 1/00* (2006.01)
(Continued)

(52) U.S. Cl.
CPC ........... *E05F 1/002* (2013.01); *E05D 11/0054* (2013.01); *E05D 11/06* (2013.01); *G06F 1/1681* (2013.01)

(58) Field of Classification Search
CPC ................ E05D 3/06; E05D 3/16; E05D 3/14; E05D 11/1021; E05D 11/0054; E05D 11/06; E05D 2003/163; E05D 2003/166; E05F 1/14; E05F 1/002; E05F 1/1681; E05F 3/18; E05F 3/20; E05F 5/02; E05F 5/006; E05Y 2201/21; E05Y 2201/212; E05Y 2201/264; E05Y 2201/412; E05Y 2201/424; E05Y 2201/428; E05Y 2201/496; E05Y 2201/254; E05Y 2800/21; E05Y 2900/20; E05Y 2900/512; E05Y 2900/538; Y10T 16/2771; Y10T 16/304; Y10T 16/5383; Y10T 16/53832; Y10T 16/53833; Y10T 16/53843; Y10T 16/547; Y10T 16/5476; Y10T 16/299
See application file for complete search history.

(56) References Cited

U.S. PATENT DOCUMENTS 5,103,532 A * 4/1992 Youngdale ................ E05D 3/16
16/288
6,288,891 B1 * 9/2001 Hasegawa ............... F16M 11/10
248/923
(Continued)

FOREIGN PATENT DOCUMENTS

TW M466462 U 11/2013
TW M471736 U 2/2014
(Continued)

*Primary Examiner* — Chuck Mah
(74) *Attorney, Agent, or Firm* — Muncy, Geissler, Olds & Lowe, P.C.

(57) ABSTRACT

A thin pivotal apparatus includes a holding seat, an arc-shaped driven member and at least one torsional force generation member. The holding seat includes a base, a housing space and a first assembly portion and a second assembly portion that are located on the base corresponding to two opposite sides of the housing space. The arc-shaped driven member is located in the housing space and includes an operational portion, a curved portion connected to the operational portion and a driving portion extended from the curved portion toward the operational portion to couple with the first assembly portion to form a pivotal relationship. Each torsional force generation member includes a first connection portion located on the second assembly portion, a second connection portion connected to the junction of the driving portion and the curved portion, and a hydraulic portion connected to the first connection portion and the second connection portion.

17 Claims, 8 Drawing Sheets

(51) Int. Cl.
*G06F 1/16* (2006.01)
*E05D 11/06* (2006.01)
*E05D 11/00* (2006.01)

(56) References Cited

U.S. PATENT DOCUMENTS

| | | | | |
|---|---|---|---|---|
| 7,197,790 B1* | 4/2007 | Edmondson | ............... | E05D 3/16 16/286 |
| 7,406,749 B2* | 8/2008 | Herper | .................... | E05F 5/006 16/286 |
| 8,947,867 B2* | 2/2015 | Hsu | ....................... | G06F 1/1624 361/679.21 |
| 9,086,842 B2* | 7/2015 | Wen | | |
| 2005/0155180 A1* | 7/2005 | Lin | .................... | E05D 11/1021 16/287 |
| 2005/0172453 A1* | 8/2005 | Duffy | ..................... | E05D 5/062 16/307 |
| 2006/0101619 A1* | 5/2006 | Tai | ......................... | F16M 11/06 16/366 |
| 2008/0141490 A1* | 6/2008 | Lautenschlager | ....... | E05F 5/006 16/235 |
| 2010/0101052 A1* | 4/2010 | Waltemate | ................ | E05D 3/16 16/297 |
| 2011/0072617 A1* | 3/2011 | Lin | ........................ | E05F 5/006 16/298 |
| 2012/0118842 A1* | 5/2012 | Salice | ...................... | E05D 3/14 211/144 |
| 2013/0152339 A1* | 6/2013 | Hung | ....................... | E05D 3/16 16/50 |
| 2013/0170122 A1* | 7/2013 | Lai | .......................... | G06F 1/16 361/679.6 |
| 2013/0239363 A1* | 9/2013 | apur | ....................... | E05F 5/006 16/50 |
| 2014/0192505 A1* | 7/2014 | Jung | ..................... | F16M 11/10 361/809 |
| 2015/0252602 A1* | 9/2015 | Nielsen | ................... | E05D 11/06 16/275 |
| 2015/0267452 A1* | 9/2015 | Zetti | ........................ | E05D 3/16 16/65 |

FOREIGN PATENT DOCUMENTS

| | | |
|---|---|---|
| TW | M483333 U | 8/2014 |
| TW | I463078 B | 12/2014 |

* cited by examiner

THIN PIVOTAL APPARATUS

FIELD OF THE INVENTION

The present invention relates to a pivotal apparatus and particularly to a thin pivotal apparatus thinning through an arc-shaped driven member.

BACKGROUND OF THE INVENTION

The general flip-top electronic devices such as notebook computers, mobile phones or the like usually have a display device and a host body pivotally coupled together through a pivotal apparatus. In general the pivotal apparatus mainly includes an axle and two connection members hinged on the axle to couple respectively with the display device and the host body. When in use the display device can be flipped against the host body in an unfolding state to perform operation as desired. When not in use, the display device can be folded over the host body in half. Through the pivotal apparatus the size of the flip-top electronic device can be greatly shrunk to facilitate storing and carrying.

Conventional pivotal apparatus, such as those disclosed in Taiwan patent Nos. 1463078, M483333, M471736 and M466462, mainly include a holding seat, two axles located abreast on the holding seat to couple respectively with a display device and a host body, and two torsional force generation members corresponding to one of the axles. Because the two axles are arranged abreast the pivotal apparatus cannot be shrunk to a smaller size. As a result, the electronic device employed the pivotal apparatus cannot be thinned as desired. In addition, the torsional force generation member used on the conventional pivotal apparatus is formed by stacking a plurality of elastic blades, and the tightness between the elastic blades is adjusted by wrenching an adjustment nut mounted onto the torsional force generation member, thereby provides a swivel torsional force to the axle. However, because the conventional structure deploys the torsional force generation member on one of the axles, during assembly each torsional force generation member requires torsional force adjustment. Such a practice cannot guarantee the two axles receiving same amount of torsional force during turning. Hence there is still room for improvement.

SUMMARY OF THE INVENTION

The primary object of the present invention is to solve the problem of structural constrains of the conventional pivotal apparatus that makes thinning impossible.

Another object of the invention is to solve another problem of the conventional pivotal apparatus of unable to steadily generate a swivel torsional force.

To achieve the foregoing objects the present invention provides a thin pivotal apparatus that includes a holding seat, an arc-shaped driven member and at least one torsional force generation member. The holding seat includes a base, a housing space formed on the base and a first assembly portion and a second assembly portion that are located on the base corresponding respectively to two opposite sides of the housing space. The arc-shaped driven member is located in the housing space and includes an operational portion, a curved portion connected to the operational portion and a driving portion extended from the curved portion toward the operational portion and coupled with the first assembly portion to form a pivotal relationship. Each torsional force generation member includes a first connection portion located on the second assembly portion, a second connection portion connected to the junction of the driving portion and the curved portion, and a hydraulic portion connected to the first connection portion and the second connection portion such that when the second connection portion is driven by the driving portion a synchronous movement is formed to generate a corresponding swivel torsional force.

In one embodiment the thin pivotal apparatus includes two sets of the torsional force generation member that are located respectively on one side of the arc-shaped driven member.

In another embodiment each torsional force generation member is implemented through hydraulic fashion. In addition, the hydraulic portion includes an oil cylinder and a push-pull rod located in the oil cylinder to move on a linear displacement against the oil cylinder so that the oil cylinder generates a corresponding swivel torsional force according to alteration of the linear displacement.

In yet another embodiment the arc-shaped driven member includes a pivotal portion located at the junction of the driving portion and the curved portion to couple with the second connection portion.

In yet another embodiment the holding seat includes a first axle located on the first assembly portion to form a pivotal relationship with the driving portion. In addition, the holding seat includes at least two limiting sleeves coupled on the first axle at two sides of the driving portion.

In yet another embodiment the holding seat includes a second axle located on the second assembly portion to form a pivotal relationship with the first connection portion of the first torsional force generation member.

In yet another embodiment the driving portion is extended from the curved portion toward the operational portion and forms a deformation angle against a horizontal extension line of the operational portion.

In yet another embodiment the thin pivotal apparatus further includes a covering lid coupled on the holding seat to partially seal the housing space; the covering lid includes a panel and at least one notch located on the panel and corresponding to each torsional force generation member.

In yet another embodiment the thin pivotal apparatus is assembled on an electronic device.

Through the structure set forth above, the invention can provide advantageous features as follows:

1. With the arc-shaped driven member sunk in the housing space of the holding seat total structure of the thin pivotal apparatus can be made thinner and flattened.

2. The invention substitutes the conventional elastic blade structure with the hydraulic portion on the torsional force generation member, as a result, the torsional force generation member can steadily generate and provide a swivel torsional force.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
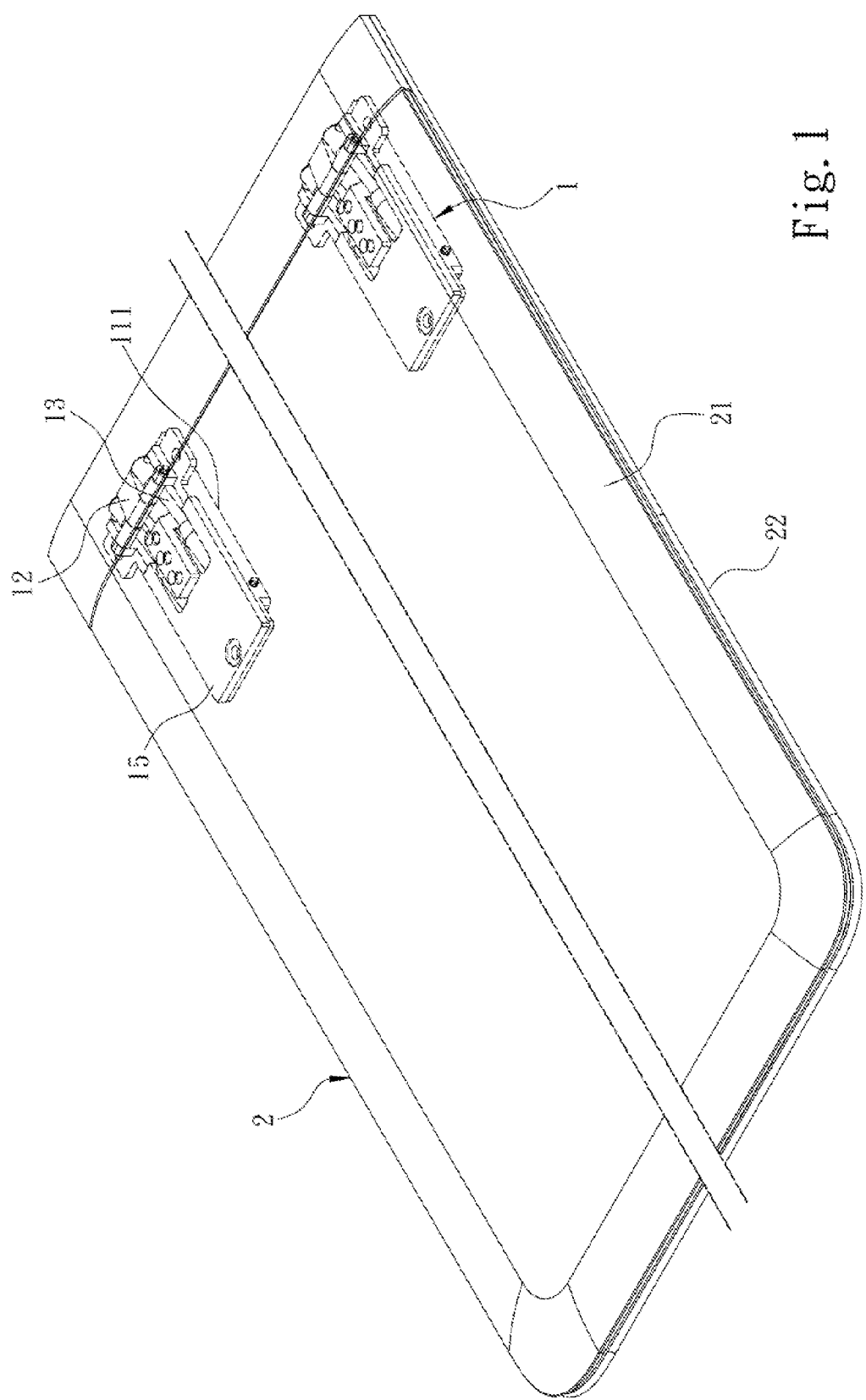
FIG. 1 is a schematic view of an embodiment of the invention assembled on an electronic device.
Figure 2:
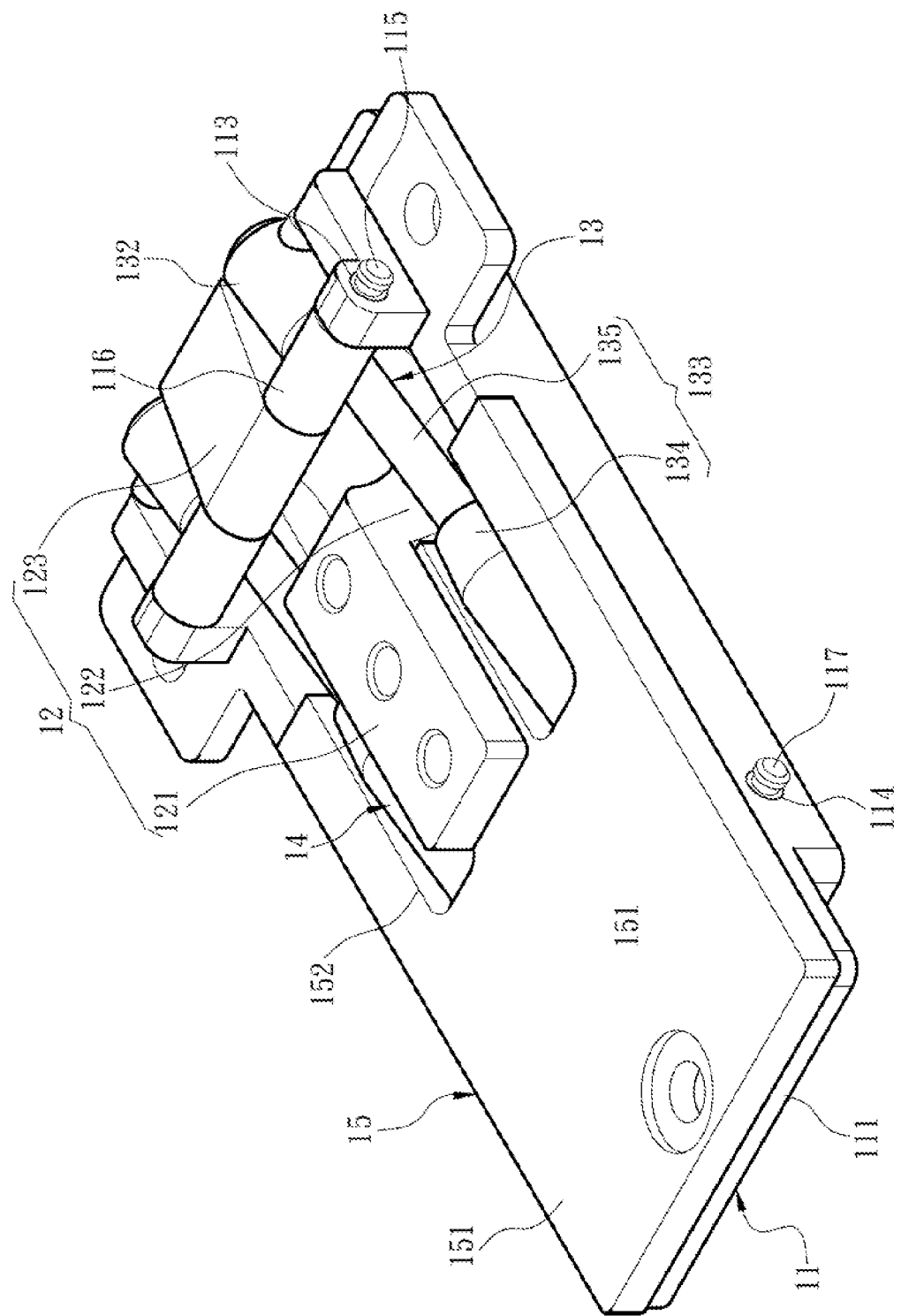
FIG. 2 is a schematic view of the structure of an embodiment of the invention.
Figure 3:
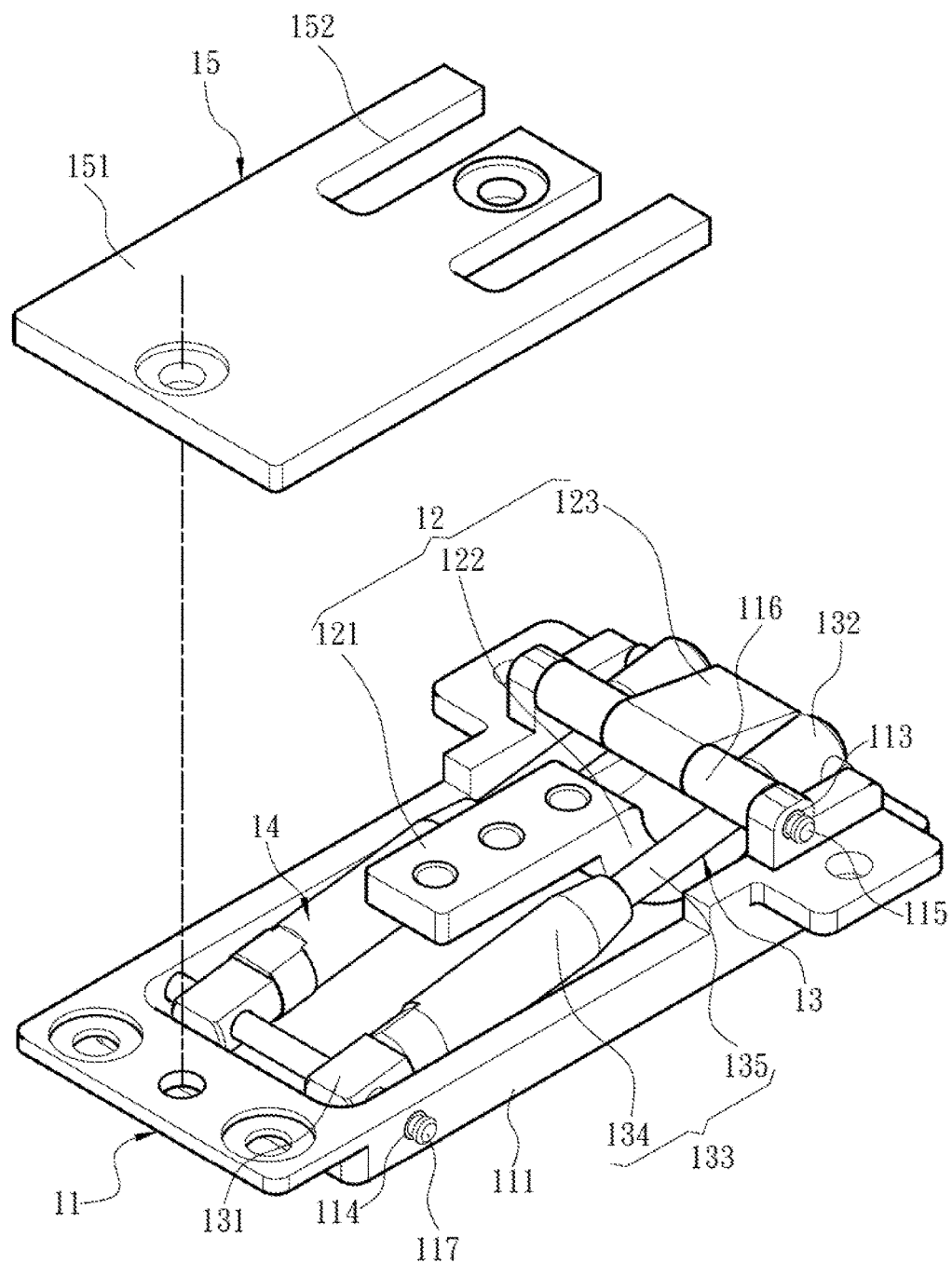
FIG. 3 is an exploded view of an embodiment of the invention.
Figure 4:
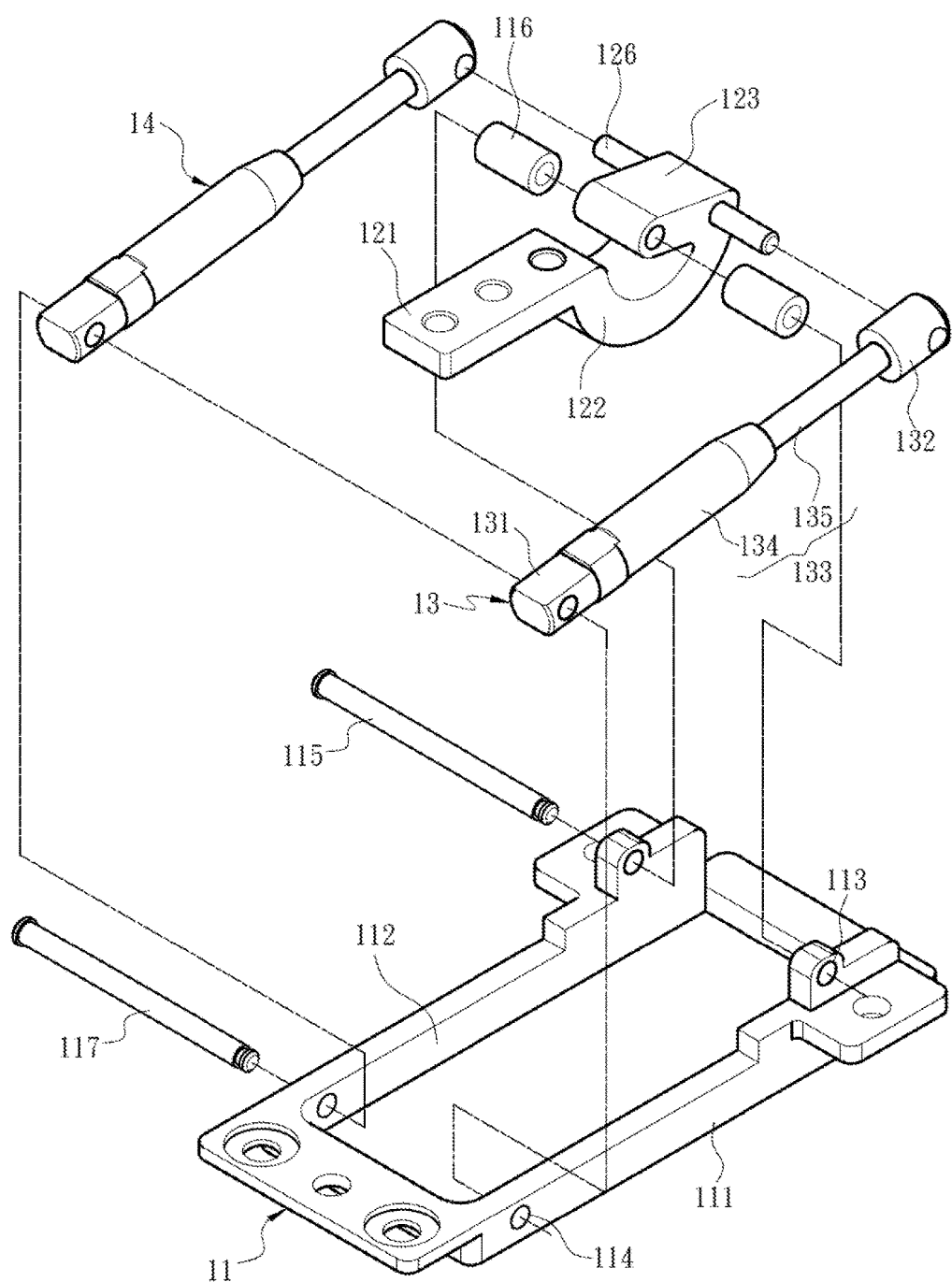
FIG. 4 is another exploded view of an embodiment of the invention.

As shown in FIG. 1, the present invention aims to provide a thin pivotal apparatus 1 that is installed on an electronic device 2 to bridge an upper case 21 and a lower case 22 such that the upper case 21 can be flipped against the lower case 22 through the thin pivotal apparatus 1. The electronic device 2 can be a notebook computer. More specifically, as shown in FIGS. 2 through 4, the thin pivotal apparatus 1 includes a holding seat 11, an arc-shaped driven member 12 and at least one torsional force generation member 13. The holding seat 11 can be installed on the lower case 22 of the electronic device 2, and includes a base 111, a housing space 112 formed on the base 111 and a first assembly portion 113 and a second assembly portion 114 located on the base 111 corresponding to two opposite ends of the housing space 112. In one embodiment the first assembly portion 113 and the second assembly portion 114 can be respectively a hole formed on the base 111.

Figure 5:
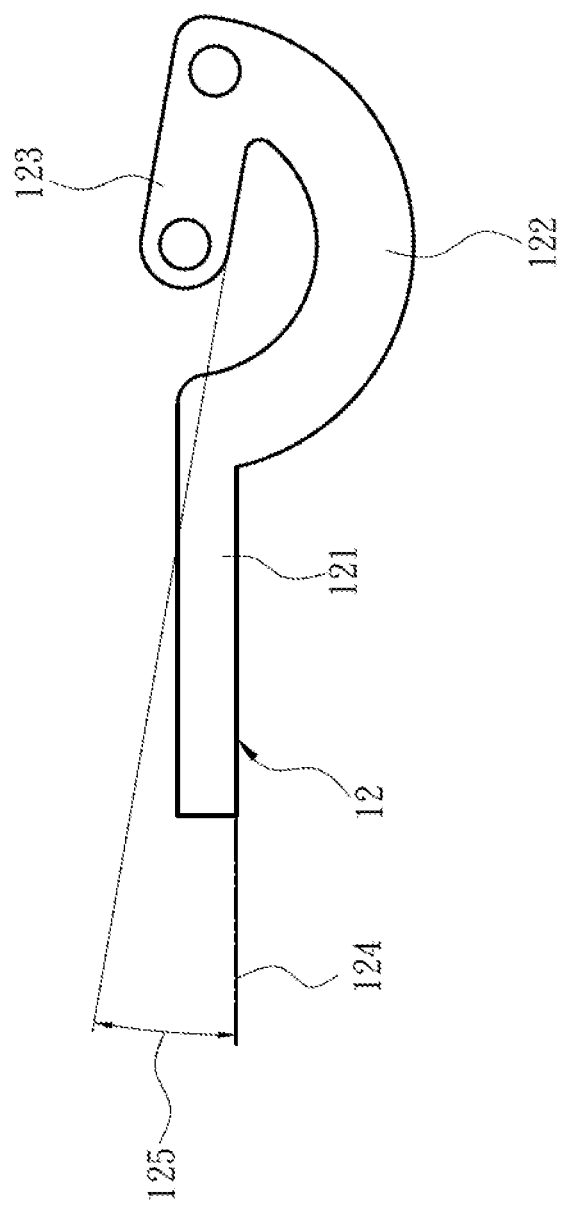
FIG. 5 is a schematic view of the arc-shaped driven member of an embodiment of the invention.

The arc-shaped driven member 12 is located in the housing space 112 and includes an operational portion 121, a curved portion 122 connected to the operational portion 121 and a driving portion 123 extended from the curved portion 122 toward the operational portion 121 and coupled with the first assembly portion 113 to form a pivotal relationship therewith. In addition, the arc-shaped driven member 12 can be coupled on the upper case 21 and be driven thereof. The operational portion 121, the curved portion 122 and the driving portion 123 can be formed in an integrated manner. In practice, the operational portion 121 can be a linear tablet to facilitate assembly with the electronic device 2. The profile of the curved portion 122 can be changed according to actual requirement. The driving portion 123 can be extended toward the operational portion 121 and remote from the curved portion 122 to form a deformation angle 125 against a horizontal extension line 124 of the operational portion 121 as shown in FIG. 5, thereby to avoid structural interference among various elements that might otherwise hinder assembly. Furthermore, in another embodiment the holding seat 11 can include a first axle 115 located on the first assembly portion 113 to form a pivotal relationship with the driving portion 123 so that the arc-shaped driven member 12 can swivel against the holding seat 11 through the first axle 115. In addition, in order to confine the position of the arc-shaped driven member 12 in the housing space 112, in yet another embodiment the holding seat 11 further includes at least two limiting sleeves 116 to couple on the first axle 115 at two sides of the driving portion 123.

Each torsional force generation member 13 includes a first connection portion 131 installed on the second assembly portion 114, a second connection portion 132 connected to the junction of the driving portion 123 and the curved portion 122, and a hydraulic portion 133 to bridge the first connection portion 131 and the second connection portion 132 and driven by the driving portion to form synchronous movement to generate a corresponding swivel torsional force. More specifically, each torsional force generation member 13 can be implemented through hydraulic fashion, namely, each hydraulic portion 133 is formed in a hydraulic structure. More specifically, each hydraulic portion 133 includes an oil cylinder 134 and a push-pull rod 135 located in the oil cylinder 134 to move on a linear displacement against the oil cylinder 134 so that the oil cylinder 134 generates a corresponding swivel torsional force according to alteration of the linear displacement. Moreover, in order to enhance the assembly strength of each torsional force generation member 13 on other structural elements, in yet another embodiment the holding seat 11 includes a second axle 117 located on the second assembly portion 114 to form a pivotal relationship with the first connection portion 131 of each torsional force generation member 13. In addition, the arc-shaped driven member 12 includes a pivotal portion 126 located at the junction of the driving portion 123 and the curved portion 122 to couple with the second connection portion 132. Moreover, during implementation of the thin pivotal apparatus 1 the number of the torsional force generation member 13 can be configured and deployed according to actual requirements. In one embodiment the thin pivotal apparatus 1 includes two torsional force generation members 13 and 14 that can be positioned at one side of the arc-shaped driven member 12.

As shown in FIGS. 2 through 5, aside from the structure previously discussed, in yet another embodiment the thin pivotal apparatus 1 further includes a covering lid 15 coupled on the holding seat 11 to partially seal the housing space 112. The covering lid 15 includes a panel 151 and at least one notch 152 located on the panel 151 and corresponding to each torsional force generation member 13, thereby can provide protection of the thin pivotal apparatus 1.

Figure 6A:
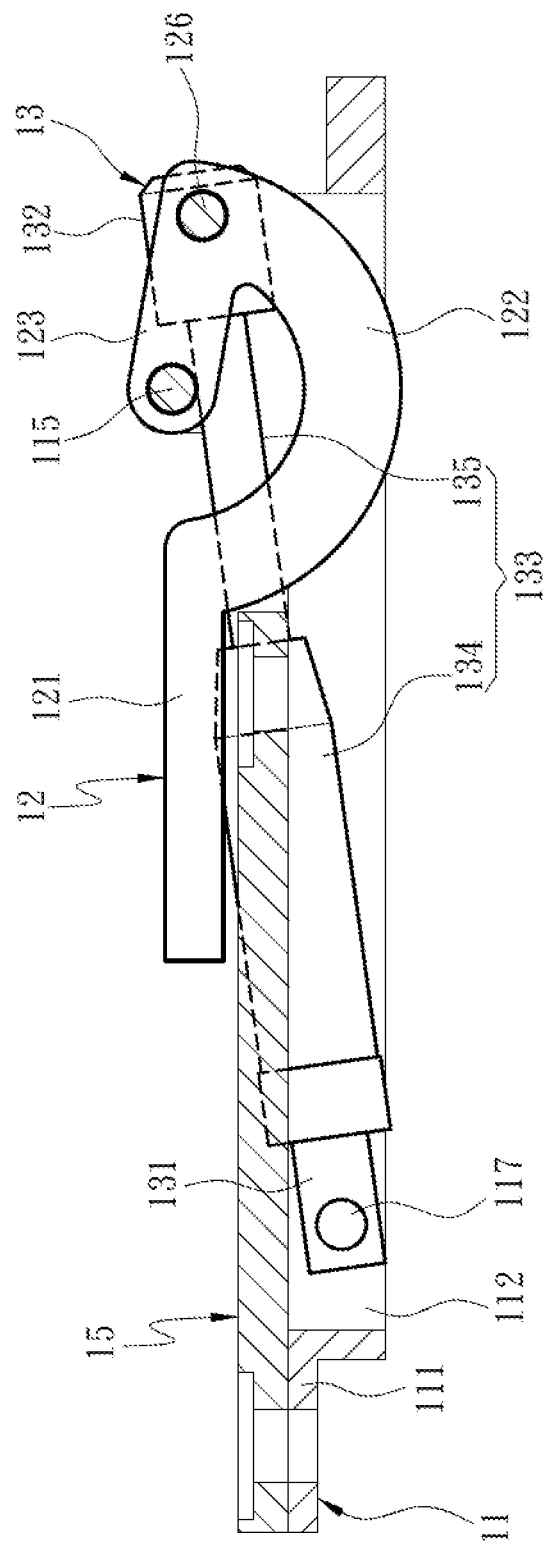
FIG. 6A is a schematic view of an embodiment of the invention in operating condition-1.
Figure 6B:
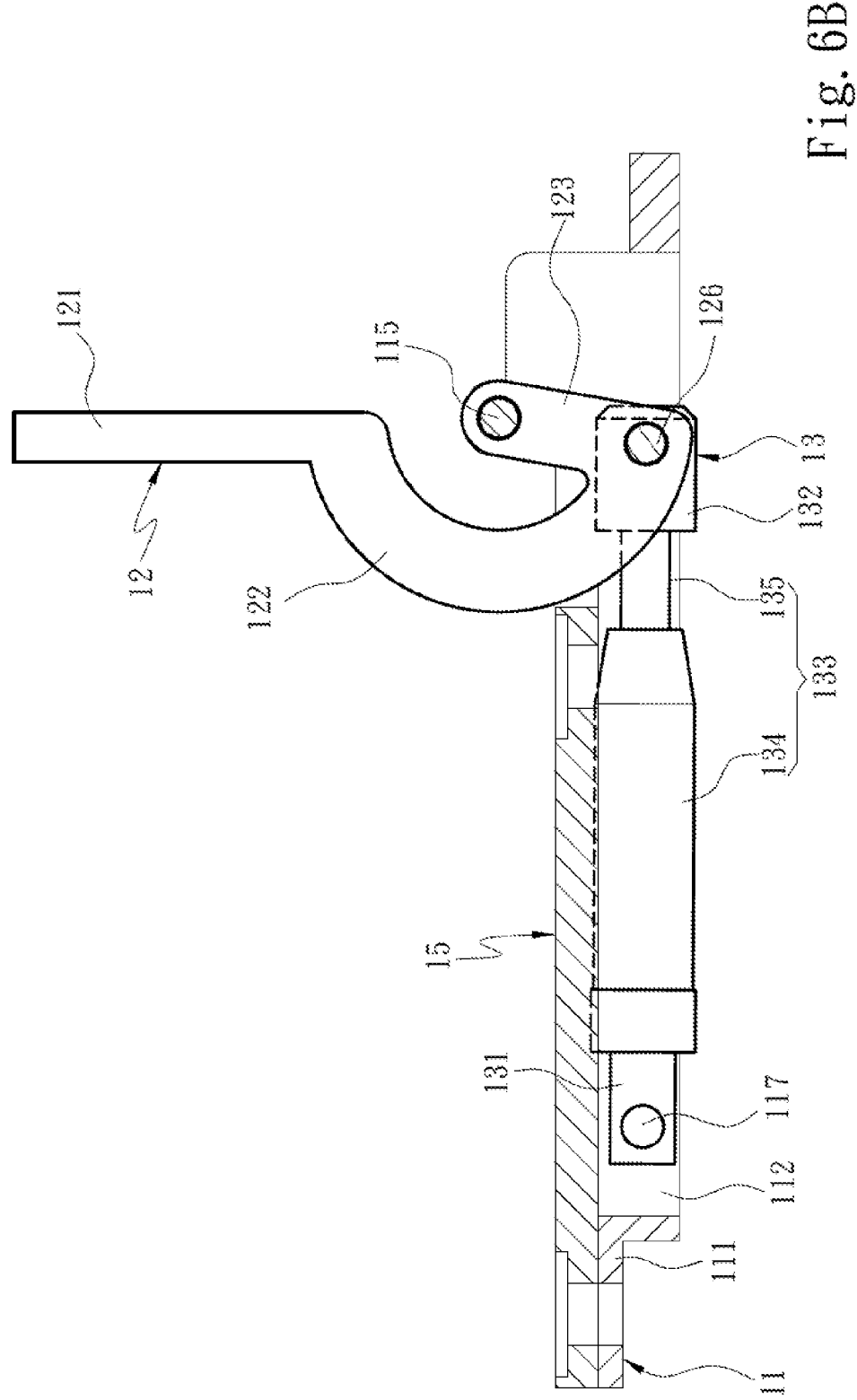
FIG. 6B is a schematic view of an embodiment of the invention in operating condition-2.
Figure 6C:
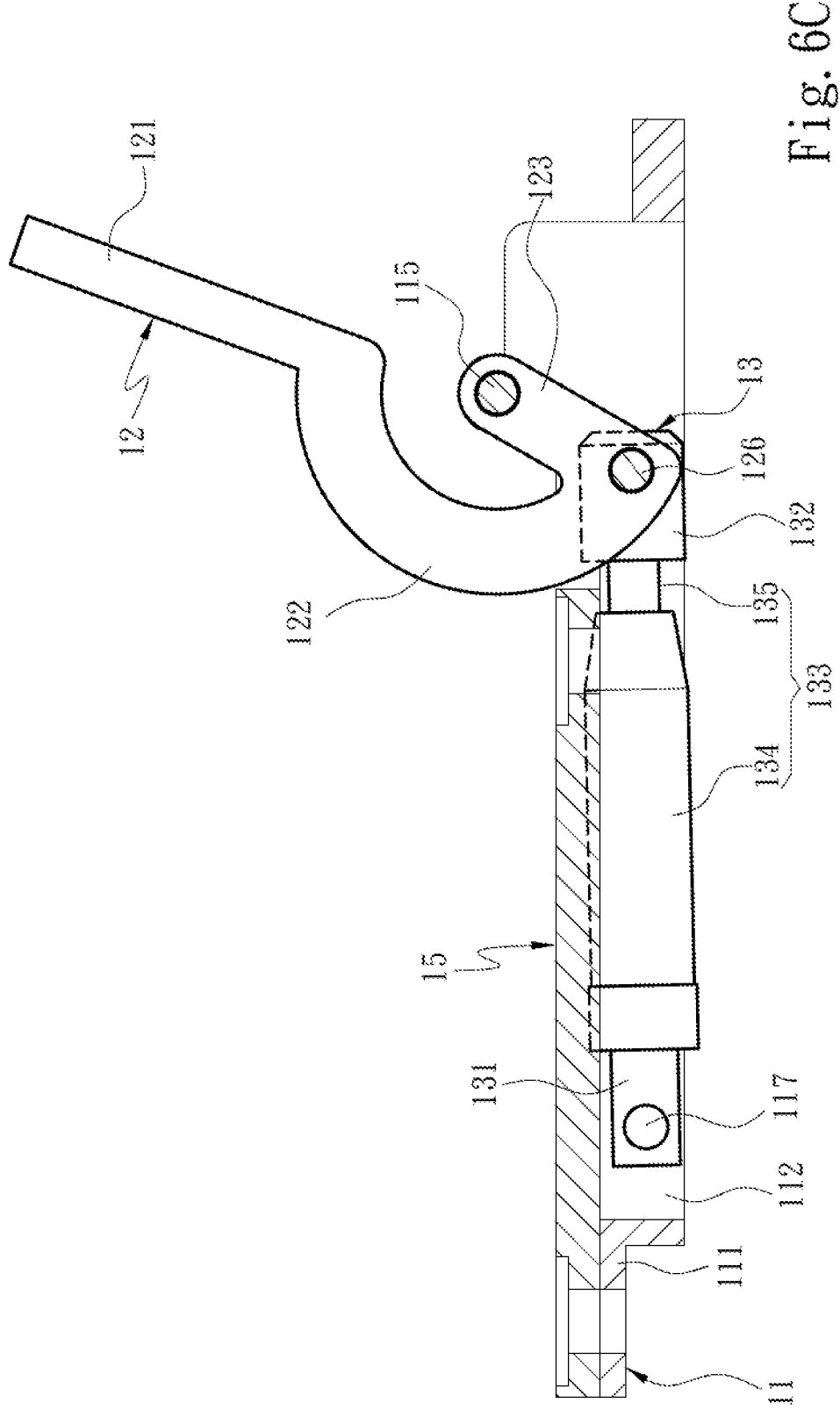
FIG. 6C is a schematic view of an embodiment of the invention in operating condition-3.

As shown in FIGS. 6A through 6C, in order to facilitate discussion of implementation of the thin pivotal apparatus 1, first, presumed that the thin pivotal apparatus 1 is in an unused state, namely, the arc-shaped driven member 12 is not yet being flipped against the holding seat 11, as shown in FIG. 6A. In this state the arc-shaped driven member 12 is parallel with the holding seat 11; when the operational portion 121 is driven by an external force and flips in a direction remote from the holding seat 11, the operational portion 121 also drives at the same time the curved portion 122 so that the driving portion 123 swivels at a corresponding range that in turn pushes the second connection portion 132 of the torsional force generation member 13 to move the hydraulic portion 133 at the same time to generate a corresponding swivel torsional force. For implementation of the hydraulic portion 133, when the second connection portion 132 of the torsional force generation member 13 is pushed by the driving portion 123 the second connection portion 132 drives the push-pull rod 135 to move toward the oil cylinder 134 so that the oil cylinder 134 generates a corresponding swivel torsional force due to the movement of the push-pull rod 135. Thus, the torsional force generation member 13 generates a corresponding swivel torsional force based on the swivel range of the arc-shaped driven member 12. As shown in FIGS. 6A through 6C, the housing space 112 on the holding seat 11 can hold the arc-shaped driven member 12 inside to form a linkage bar configuration by collaborating with the torsional force generation member 13, thereby can flatten the pivotal apparatus to become thinner to be adaptable in the electronic device 2 that includes a thinning requirement. Through the structure set forth above the torsional force generation member 13 can steadily provide a corresponding swivel torsional force. In addition, the thin pivotal apparatus 1 of the invention also can be modularized in implementation.

As a conclusion, the thin pivotal apparatus of the invention includes a holding seat, an arc-shaped driven member and at least one torsional force generation member. The holding seat includes a base, a housing space formed on the base and a first assembly portion and a second assembly portion located on the base and corresponding to two opposite ends of the housing space. The arc-shaped driven member is located in the housing space and includes an operational portion, a curved portion connected to the operational portion and a driving portion extended from the curved portion toward the operational portion and coupled with the first assembly portion to form a pivotal relationship. Each torsional force generation member includes a first connection portion coupled on the second assembly portion, a second connection portion connected to the junction of the driving portion and the curved portion and a hydraulic portion connected to the first connection portion and the second connection portion and driven by the driving portion to move synchronously to generate a corresponding swivel torsional force. Thus, total structure of the pivotal apparatus can be made thinner, and the torsional force generation member can provide a corresponding swivel torsional force according to the swivel extent of the arc-shaped driven member to meet user's requirements.

What is claimed is:

1. A thin pivotal apparatus, comprising:
   a holding seat including a base, a housing space formed on the base and a first assembly portion and a second assembly portion located on the base and corresponding to two opposite sides of the housing space;
   an arc-shaped driven member which is located in the housing space and includes an operational portion, a curved portion connected to the operational portion and a driving portion extended from the curved portion toward the operational portion and connected to the first assembly portion to form a pivotal relationship; and
   at least one torsional force generation member including a first connection portion pivotally installed on the second assembly portion, a second connection portion pivotally connected to the junction of the driving portion and the curved portion, and a hydraulic portion connected between the first connection portion and the second connection portion and driven by the driving portion to move synchronously to generate a corresponding swivel torsional force.

2. The thin pivotal apparatus of claim 1 further including two sets of the torsional force generation member that are located respectively at one side of the arc-shaped driven member.

3. The thin pivotal apparatus of claim 2, wherein each torsional force generation member is implemented through hydraulic fashion.

4. The thin pivotal apparatus of claim 3, wherein each hydraulic portion includes an oil cylinder and a push-pull rod located in the oil cylinder and movable against the oil cylinder on a linear displacement so that the oil cylinder generates a corresponding swivel torsional force according to alterations of the linear displacement.

5. The thin pivotal apparatus of claim 4 further including a covering lid coupled on the holding seat to partially seal the housing space, the covering lid including a panel and at least one notch located on the panel and corresponding to each torsional force generation member.

6. The thin pivotal apparatus of claim 4, wherein the thin pivotal apparatus is installed on an electronic device.

7. The thin pivotal apparatus of claim 4, wherein the driving portion is extended toward the operational portion remote from the curved portion and forms a deformation angle against a horizontal extension line of the operational portion.

8. The thin pivotal apparatus of claim 7 further including a covering lid coupled on the holding seat to partially seal the housing space, the covering lid including a panel and at least one notch located on the panel and corresponding to each torsional force generation member.

9. The thin pivotal apparatus of claim 8, wherein the thin pivotal apparatus is installed on an electronic device.

10. The thin pivotal apparatus of claim 7, wherein the thin pivotal apparatus is installed on an electronic device.

11. The thin pivotal apparatus of claim 1, wherein the arc-shaped driven member includes a pivotal portion located at the junction of the driving portion and the curved portion and coupled on the second connection portion.

12. The thin pivotal apparatus of claim 1, wherein the holding seat includes a first axle located on the first assembly portion to form a pivotal relationship with the driving portion.

13. The thin pivotal apparatus of claim 12, wherein the holding seat includes at least two limiting sleeves coupled on the first axle at two sides of the driving portion.

14. The thin pivotal apparatus of claim 12, wherein the holding seat includes a second axle located on the second assembly portion to form a pivotal relationship with the first connection portion of each torsional force generation member.

15. The thin pivotal apparatus of claim 1, wherein the driving portion is extended toward the operational portion remote from the curved portion and forms a deformation angle against a horizontal extension line of the operational portion.

16. The thin pivotal apparatus of claim 1 further including a covering lid coupled on the holding seat to partially seal the housing space, the covering lid including a panel and at least one notch located on the panel and corresponding to each torsional force generation member.

17. The thin pivotal apparatus of claim 1, wherein the thin pivotal apparatus is installed on an electronic device.

* * * * *